United States Patent
Hardouin et al.

(10) Patent No.: US 11,269,092 B2
(45) Date of Patent: Mar. 8, 2022

(54) METHOD AND SYSTEM FOR OPTIMIZING SEISMIC DATA ACQUISITION USING COMPRESSED SENSING

(71) Applicant: CGG SERVICES SAS, Massy (FR)

(72) Inventors: Paul Hardouin, Viroflay (FR); Thomas Bianchi, Paris (FR)

(73) Assignee: SERCEL SAS, Carquefou (FR)

( * ) Notice: Subject to any disclaimer, the term of this patent is extended or adjusted under 35 U.S.C. 154(b) by 524 days.

(21) Appl. No.: 16/014,566

(22) Filed: Jun. 21, 2018

(65) Prior Publication Data

US 2019/0391286 A1    Dec. 26, 2019

(51) Int. Cl.
*G01V 1/00* (2006.01)
*G01V 1/09* (2006.01)

(52) U.S. Cl.
CPC .......... *G01V 1/003* (2013.01); *G01V 1/09* (2013.01); *G01V 2210/1295* (2013.01)

(58) Field of Classification Search
CPC .. G01V 1/003; G01V 1/09; G01V 2210/1295; G01V 2210/1293; G01V 2210/1425; G01V 2210/127
See application file for complete search history.

(56) References Cited

U.S. PATENT DOCUMENTS

| | | | |
|---|---|---|---|
| 9,632,193 B2 | 4/2017 | Li et al. | |
| 10,996,359 B2* | 5/2021 | Halliday | G01V 1/38 |
| 2009/0323472 A1* | 12/2009 | Howe | G01V 1/003 367/41 |
| 2014/0043935 A1* | 2/2014 | Cloud | G01V 1/003 367/14 |
| 2015/0293241 A1* | 10/2015 | Hegna | G01V 1/325 367/15 |

FOREIGN PATENT DOCUMENTS

| | | | | |
|---|---|---|---|---|
| EP | 2728381 A2 * | 5/2014 | | G01V 1/003 |
| EP | 2728381 A2 | 5/2014 | | |
| WO | 03067283 A2 | 8/2003 | | |

OTHER PUBLICATIONS

Xander Campman et al., "Sparse seismic wavefield sampling", The Leading Edge, Aug. 2017, pp. 654-660.
Cordsen, A., et al., "Field Layouts," Chapter 5 in "Planning Land 3-D Seismic Surveys," Society of Exploration Geophysicists, Tulsa, OK, USA, Jan. 1, 2000, pp. 77-105, XP055645562.
Cordsen, A., et al., "Initial Considerations," Chapter 1 in "Planning Land 3-D Seismic Surveys," Society of Exploration Geophysicists, Tulsa, OK, USA, Jan. 1, 2000, pp. 1-12 (23 pages total), XP055645548.

(Continued)

*Primary Examiner* — Ian J Lobo
(74) *Attorney, Agent, or Firm* — Patent Portfolio Builders PLLC

(57) ABSTRACT

Methods and systems for seismic data acquisition in a survey area use compressed sensing and take into consideration operational limitations. The operational limitations may be related to the equipment used for the survey, the topography of the surveyed area or limitations that otherwise optimize the survey path.

20 Claims, 14 Drawing Sheets

(56) References Cited

OTHER PUBLICATIONS

Cordsen, A., et al., "Practical Field Considerations," Chapter 9 in "Planning Land 3-D Seismic Surveys," Society of Exploration Geophysicists, Tulsa, OK, USA, Jan. 1, 2000, pp. 135-156, XP055645566.

Cordsen, A., et al., "Source Equipment," Chapter 6 in "Planning Land 3-D Seismic Surveys," Society of Exploration Geophysicists, Tulsa, OK, USA, Jan. 1, 2000, pp. 107-119, XP055645622.

Cordsen, A., et al., "Special Interest Topics," Chapter 12 in "Planning Land 3-D Seismic Surveys," Society of Exploration Geophysicists, Tulsa, OK, USA, Jan. 1, 2000, pp. 175-181, XP055645572.

International Search Report and Written Opinion of the International Searching Authority (Forms PCT/ISA/220, PCT/ISA/210 and PCT/ISA/237) for International Application No. PCT/IB2019/000712 dated Dec. 4, 2019.

Vermeer, G.J.O,, "Fundamentals of 3-D seismic survey design," Feb. 21, 2001, pp. 1-185 (207 pages total), XP055348831.

Chengbo Li et al., "Interpolated compressive sensing for seismic data reconstruction", SEG Las Vegas 2012 Annual Meeting, Nov. 4-9, 2012, Las Vegas, Nevada, pp. 1-6.

David L. Donoho, "Compressed Sensing", Sep. 14, 2004, Department of Statistics, Stanford University, pp. 1-34.

Felix J. Hermann, "Randomized sampling and sparsity: Getting more information from fewer samples", Geophysics, Nov.-Dec. 2010, pp. WB173-WB187, vol. 75, No. 6.

Gilles Hennenfent et al., "Random sampling: new insights into the reconstruction of coarsely-sampled wavefields", SEG/San Antonio 2007 Annual Meeting, Sep. 23-26, 2007, San Antonio, Texas, pp. 2575-2579.

Gilles Hennenfent et al., "Simply denoise: Wavefield reconstruction via jittered undersampling", Geophysics, May-Jun. 2008, pp. V-19-V28, vol. 73, No. 3.

* cited by examiner

METHOD AND SYSTEM FOR OPTIMIZING SEISMIC DATA ACQUISITION USING COMPRESSED SENSING

BACKGROUND

Technical Field

Embodiments of the subject matter disclosed herein generally relate to methods and systems for designing seismic data acquisition for surveying a predetermined area and, more specifically, to optimizing source path while using compressed sensing and taking into consideration operational constraints.

Discussion of the Background

Seismic surveys on land and in marine environments are used for generating images of geophysical structures under the Earth's surface or under the seafloor (subsurface). These images enable those trained in the field to estimate the presence and location of oil and gas reservoirs. Obtaining high-resolution images of the subsurface is important to efficient exploration and exploitation of oil and gas reservoirs.

During a seismic survey, seismic excitations are injected into the subsurface to probe its structure. These seismic excitations may be generated by an impulsive or a vibratory source. Reflections and refractions of these seismic excitations are detected by seismic receivers, after traveling from the source through the explored subsurface, to produce a seismic data record. The seismic data is a series of seismic amplitudes recorded at sampling times. The travel times corresponding to large amplitudes indicate the position of reflection and/or refraction layer interfaces (where the impedance changes inside the subsurface), thereby allowing generation of a structural image thereof.

Classical seismic data acquisition designs, which use regular grids as illustrated in FIG. 1, run into spatial aliasing issues due to spatial sampling thinness, specially in receiver gathers or source gathers. The locations (the dots in FIG. 1) where the seismic excitations are injected align along source lines (110, 112, 114, . . . ) that are perpendicular to receiver lines (not shown). This type of data acquisition allows sorting data in cross-spread gathers, and denoising ground-roll, for instance. However, spatial aliasing issues prevent, for example, efficiently removing backscatter signals. Thin carpet shooting (i.e., source spatial sampling is fine/thin/closer) could be a reasonable answer to this problem, but such a design is very expensive.

A recent trend in data acquisition is the use of compressed sensing acquisition in which locations where the seismic excitations are injected into the subsurface no longer follow a regular pattern, but instead employ some randomness. D. L. Donoho's Technical Report, "Compressed sensing," published by Stanford University in 2004, discussed random sampling and compressed sensing theories. Random sampling via a discrete random under-sampling on a sub-grid provides the advantage of better Fourier processing properties, while aliasing properties are limited by the sub-grid.

G. Hennenfent et al.'s paper entitled, "Simply denoise: Wavefield reconstruction via jittered undersampling," published in *Geophysics*, Vol. 73, No. 3, pp V 18-28, in 2008, discusses random sampling in predefined zones (also known as "jitter sampling"). This approach ensures a uniform distribution at the local level and avoids problems with gaps in the data that are larger than the spatiotemporal extent of the transform elements.

Practical implementation of compressed sensing theories has to take into consideration other issues such as: minimizing source path while maintaining the randomness of the shooting locations, and operational constraints related, for example, to the source's maneuverability and the survey's terrain features. Thus, there is a need to develop methods and systems for designing seismic data acquisition that uses compressed sensing and takes into consideration operational constraints.

SUMMARY

Various embodiments design an optimized data acquisition plan for a seismic survey in a given area using a random spatial sampling and complying with operational constraints.

According to an embodiment, there is a method for designing seismic data acquisition in a survey area. The method includes defining non-overlapping successive pavements along a survey path so as to cover the survey area. The method further includes sequentially determining activation points of a seismic source inside the pavements, wherein a current activation point in a pavement is selected if included in a set of activation points in successive pavements along the survey path, the set of activation points starting with the current activation point and satisfying predetermined operational constraints.

According to another embodiment, there is a seismic data acquisition system including a seismic source configured to generate seismic excitations that propagate inside an explored underground formation, and receivers configured and placed to detect reflections of the seismic excitations emerging from the explored underground formation. The seismic data acquisition system also includes a controller configured to guide the seismic source at activation points. The controller determines the activation points by: defining non-overlapping successive pavements along survey path so as to cover a survey area, and sequentially determines the activation points inside pavements along the survey path. Here, a current activation point in a pavement is selected if included in a set of activation points in successive pavements along the survey path, the set of activation points starting with the current activation point and satisfying predetermined operational constraints.

According to yet another embodiment, there is a seismic survey design apparatus including an interface configured to receive information about a survey area and operational constraints, and a processor connected to the interface and configured to define non-overlapping successive pavements along a survey path so as to cover the survey area. The processor is further configured to successively determine activation points of a seismic source inside pavements, wherein a current activation point in a pavement is selected if included in a set of activation points in successive pavements along the survey path, the set of activation points starting with the current activation point and satisfying predetermined operational constraints.

BRIEF DESCRIPTION OF THE DRAWINGS

For a more complete understanding of the present inventive concept, reference is now made to the following descriptions taken in conjunction with the accompanying drawings, in which.

DETAILED DESCRIPTION OF THE INVENTION

Figure 1:
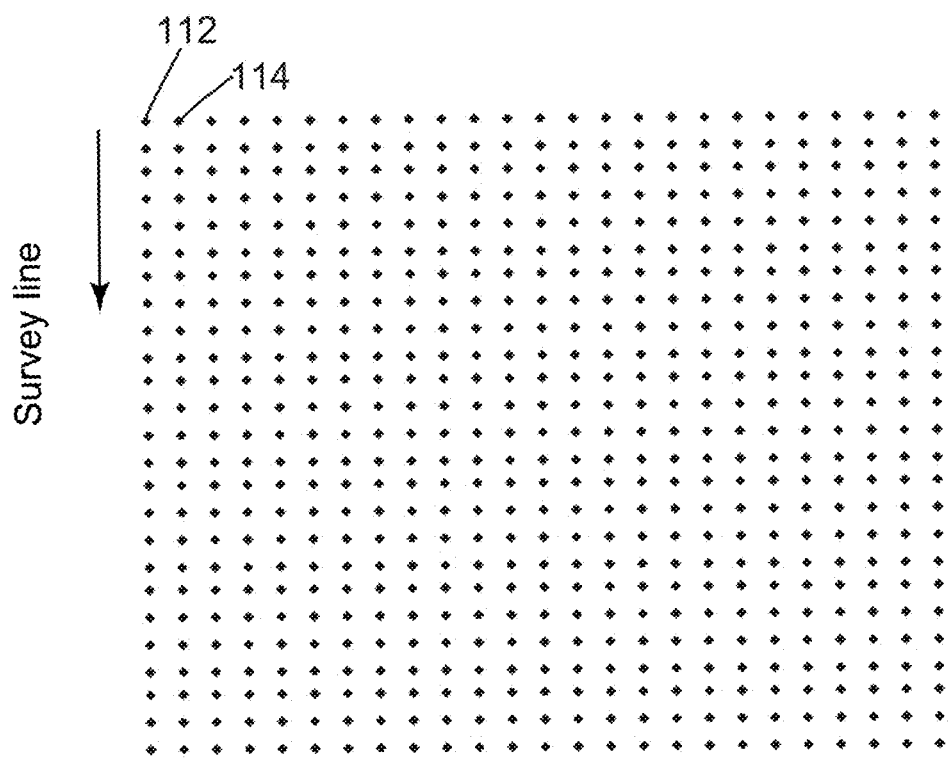
FIG. 1 illustrates a grid of source activation locations for a conventional data acquisition plan.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a land seismic system with a vibrator source. However, the embodiments to be discussed next are not limited to a land seismic system, but they can be applied to a system that uses sources other than vibratory sources.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The design methods and system described in this section generate a random spatial sampling design of seismic data acquisition efficient and compliant with operational constraints. The inventive concept combines a non-random aspect and a random aspect. The non-random aspect related to defining non-overlapping successive pavements that cover the survey area. The pavements are areas that may have a regular shape (e.g., rectangular or even square, hexagonal, etc.) and may be grouped in survey lines along which the source moves.

The random aspect relates to associating one random activation point in each pavement. As already mentioned, this description focusses on vibrator sources moved on land by trucks. The vibrators are actuated to generate seismic excitations injected in the underground. However, impulsive sources may also be used and, for this type of sources, the term "shooting" location is more frequently used. In this document, the term "activation" is used for both shooting locations and actuation locations. Note also that "point(s)" and "location(s)" are used interchangeably.

Defining pavements and picking random points inside each pavement do not ensure an efficient, feasible path for the vibrator. On one hand, the transition from one activation point in one pavement to a next activation point in the next pavement may not be possible due to the limited curvature the truck path may have. On the other hand, a tilt larger than a certain limit along the path between activation points may cause the truck to turn over. Yet another aspect that may be considered is to minimize/optimize the length of the truck's path and, implicitly, the survey time. One way to implement path length optimization is by limiting the magnitude of the acute angle between successive path segments defined by activation points in adjacent pavements.

Figure 2:
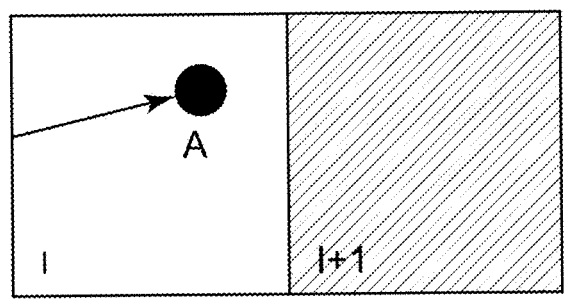
FIG. 2 illustrates adjacent pavements defined according to an embodiment.
Figure 3:
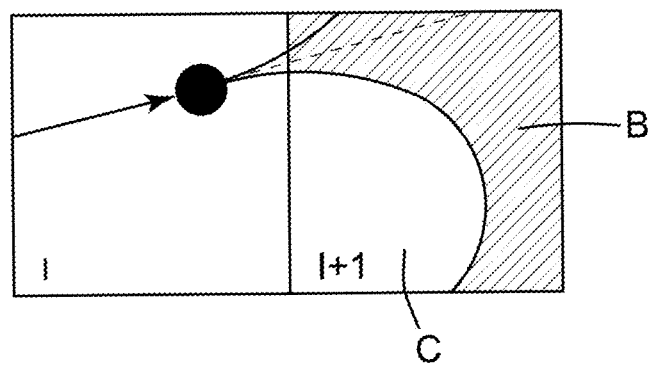
FIG. 3 illustrates the impact of curvature limitation in adjacent pavements according to an embodiment.
Figure 4:
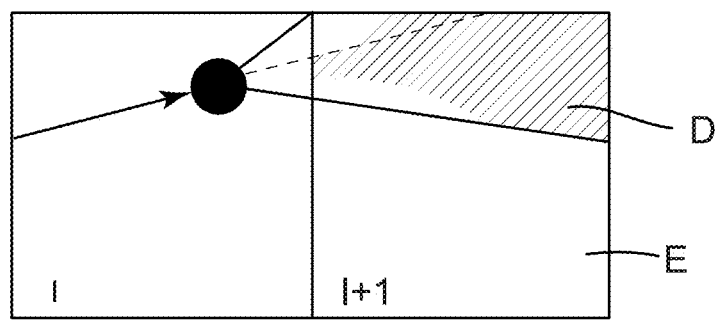
FIG. 4 illustrates the impact of angle limitation in adjacent pavements according to an embodiment.
Figure 5:
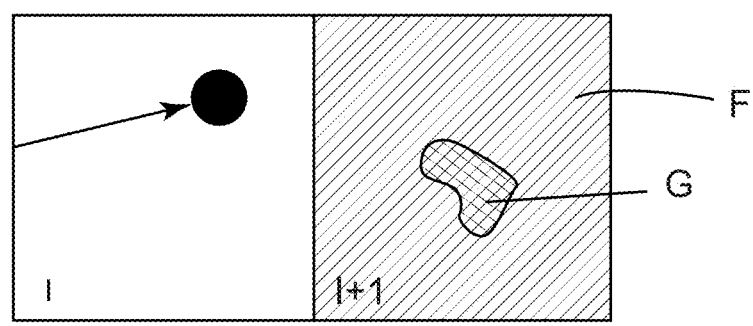
FIG. 5 illustrates a forbidden zone in a pavement according to an embodiment.
Figure 6:
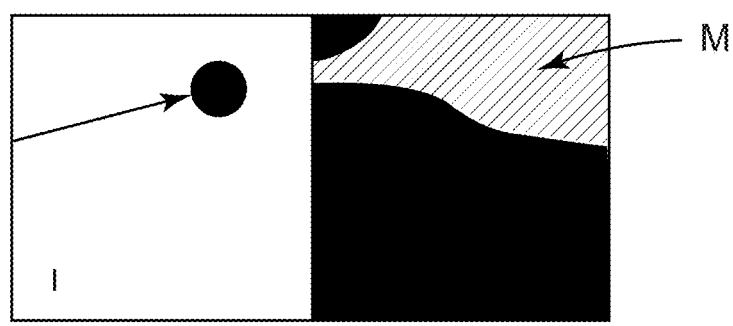
FIG. 6 illustrates allowed area when all the operational limitations are taken into consideration.

FIG. 2 illustrates two adjacent pavements I and I+1, with point A selected in pavement I. FIG. 3 illustrates the curvature limitation in pavement I+1, area B being allowed area and area C being forbidden area. FIG. 4 illustrates limiting the magnitude of the acute angle between successive path segments, with area D being allowed area and area E being forbidden area. FIG. 5 illustrates a forbidden zone G in pavement I+1, while the rest, area F, is allowed. The forbidden zone may be identified based on topological information as an obstacle (e.g., a tree) or determined as having a tilt larger than allowable. Finally FIG. 6 illustrates a possible area M for an activation point in pavement I+1 when all these operational constraints are taken into consideration.

The operational constraints may be related to a set of pavements rather than to only two successive pavements. Shooting points in a set of pavements form a scenario that may be validated in the following manner. Each constraint is associated with a weight. If the product of the weights associated with constraints which are met exceeds a predetermined threshold then the scenario is validated.

Figure 7:
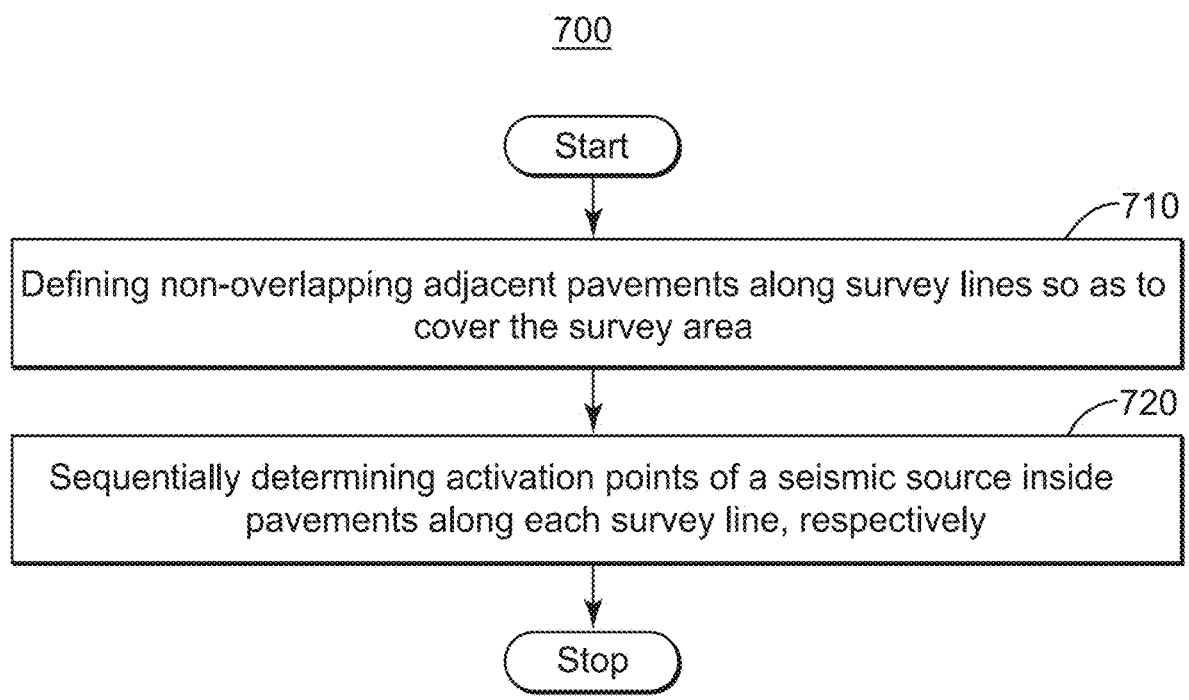
FIG. 7 is a flowchart of a method according to an embodiment.

FIG. 7 is a flowchart illustrating a method 700 for designing seismic data acquisition according to an embodiment. Method 700 includes defining non-overlapping successive pavements along survey path so as to cover the survey area at 710 (i.e., the non-random aspect as described above). The method further includes, at 720, sequentially determining activation points of a seismic source inside pavements along the survey path (i.e., the random aspect). Here, a current activation point in a pavement is selected if included in a set of activation points in successive pavements along the survey path, the set of activation points starting with the current activation point and satisfying predetermined operational constraints. In other words, activation points are random within an area allowed by the operational constraints.

Figure 8:
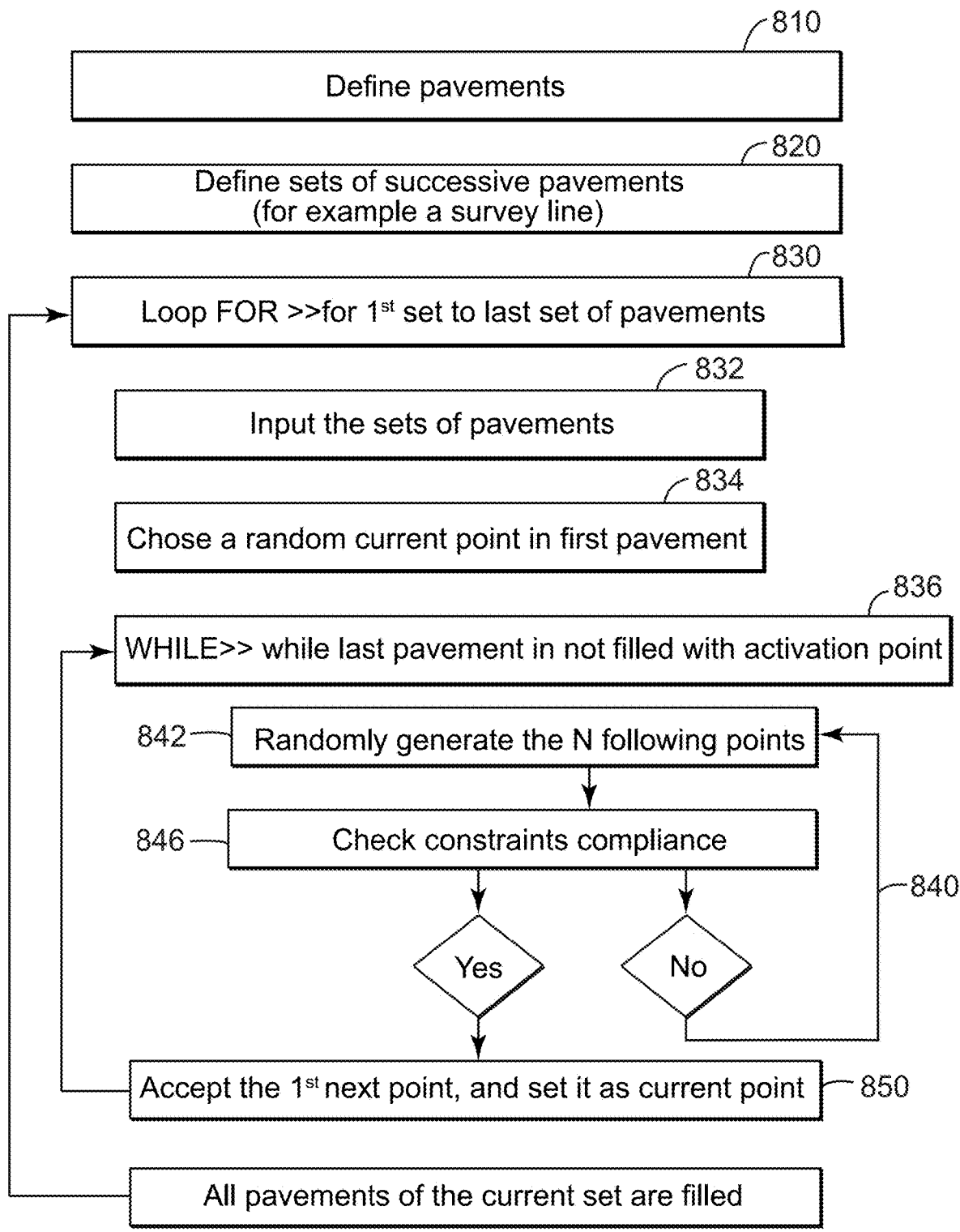
FIG. 8 is a schematic data flow according to an embodiment.

The schematic data flow in FIG. 8 provides more detailed explanations. After defining the pavements at 810, sets of successive pavements are defined at 820, with each set including two or more (i.e., N) pavements which may be along a survey line. Then, a loop 830 over all sets is executed over all sets of pavements to select the activation points. Loop 830 includes, inputting a set of pavements at 832, choosing randomly a current point in the allowed area (e.g., M in FIG. 6) of the first pavement in the set at 834.

Then, another loop 836 is executed (as indicated by the "while" condition) as long as 840 not all the points in a current set have an activation point (randomly placed at 842) so as to comply with all predetermined operational constraints (tested at 846). If the constraints are satisfied, the first activation point is accepted and included in the survey plan (set as current point) at 850, and another set along the same survey line in the source moving direction is considered. The loop 830 ends when all pavements of all sets have selected activation points at 860. This group simulation and selection of activation points avoids dead-end choices (i.e., choosing an activation point in a pavement that leaves no possible activation points in next pavements along a survey line).

The term "predetermined operational constraints" in this document refers to one or more specific constraints. Some operational constraints may be related to constructive limitations of the survey equipment such as a minimum curvature or a maximum tilt that the seismic source may be subjected to. Other operational constraints may be related to the physical reality in the survey area, e.g., presence of a tree or a water body. Some of these constraints may be inferred from topographic information. However, it is possible that information obtained by direct observation during the survey to cause plan alteration with a newly added constraint. Last but not least, some constraints may arise from the desire to optimize the survey path such as not to extend the survey.

Such a constraint may be limiting the acute angle between successive segments formed by actuation pints in adjacent pavements. No limitations should be a priori inferred regarding the number and the type of the predetermined operational constraints.

In one embodiment the predetermined operational constraints include limitations related to a motion of a seismic source from one activation point to a next activation point. Such limitations related to the motion of the seismic source may be a minimum curvature of a source's path between adjacent activation points, or (alternatively or additionally) a maximum acute angle between successive segments defined by activation points in adjacent pavements.

In an embodiment the method may further include associating topographic information with the pavements. The topographic information may then be used to evaluate one of the predetermined operational constraints. For example, the topographic information may be used to evaluate tilt so that the truck/seismic source not to exceed a maximum tilt while moving from one activation point to a next activation point. In another example, the topographic information may be used to identify forbidden zones within the pavements.

The pavements may have rectangular, square, hexagonal other shapes. In one embodiment, in one or more pavements are defined predetermined locations for the activation points. These predetermined locations may form sub-grids.

Figure 9:
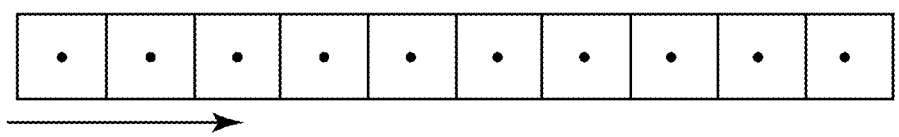
FIG. 9 is an illustration of conventionally selected shooting locations in the middle of pavements along a survey line.

FIGS. 9-17 refer to a first case study in which the pavements are squares with a 25 m side, minimum vibrator curvature is 5 m and maximum acute angle between successive segments of the path is 30°. FIG. 9 illustrates pavements along a survey line in which the shooting points are selected regularly in the middle of each pavement according to conventional methods. The segment length between successive shooting points is 25 m.

Figure 10:
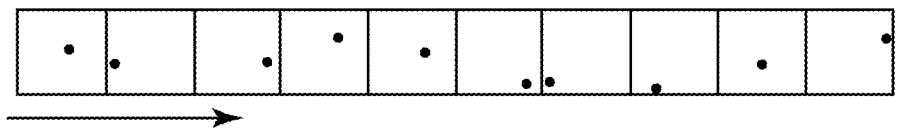
FIG. 10 is an illustration of shooting locations inside pavements along a survey line according to an embodiment.

FIG. 10 illustrates the same pavements, but here the shooting points are selected randomly while taking into consideration operational constraints according to an embodiment. The mean length between successive shooting points is 25.5 m (2% longer than the conventional length).

Figure 11:
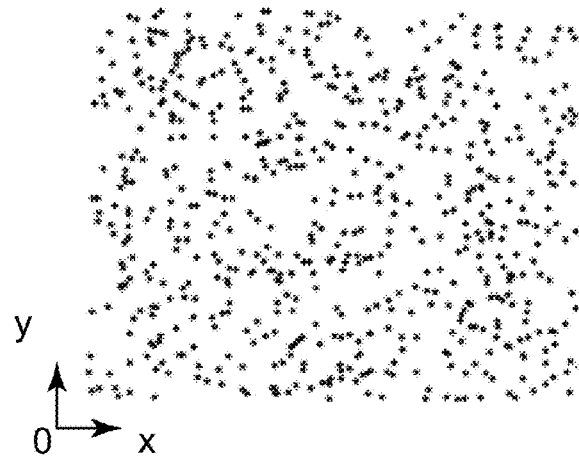
FIG. 11 illustrates a two-dimensional (2D) survey area inside which the shooting points have been selected randomly, without taking into consideration any operational constraints, not even having one shot in each pavement.

FIG. 11 illustrates a 2D survey area corresponding to FIG. 1, where the shooting points are selected randomly without taking into consideration operational constraints, fully random, not even having one shot in each pavement. Note that here the 2D refers to the figure and does not refer to the acquisition, which could be 2D or 3D.

Figure 12:
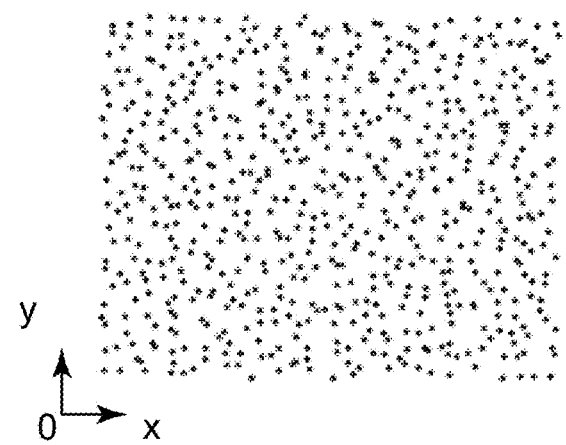
FIG. 12 illustrates the 2D survey area inside which for each pavement one shooting point has been selected randomly according to an embodiment.
Figure 13:
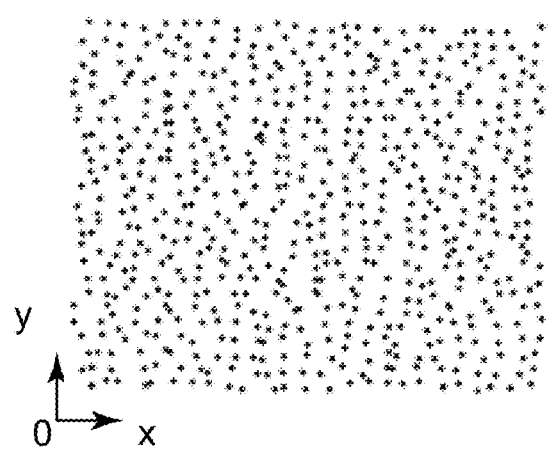
FIG. 13 illustrates the 2D survey area inside which one shooting points have been selected randomly in each pavement, taking into consideration all the operational limitations according to an embodiment.

FIG. 12 illustrates the same 2D survey area in which there is one randomly selected shot in each pavement resulting in an increase of 8% in the mean length between successive shooting points. Finally, FIG. 13 illustrates yet the same 2D survey in which the shooting points have been selected randomly, one shot in each pavement, taking into consideration operational constraints (i.e., including the acute angle limitation), resulting in another increase of only 2% in the mean length between successive shooting points.

Figure 14:
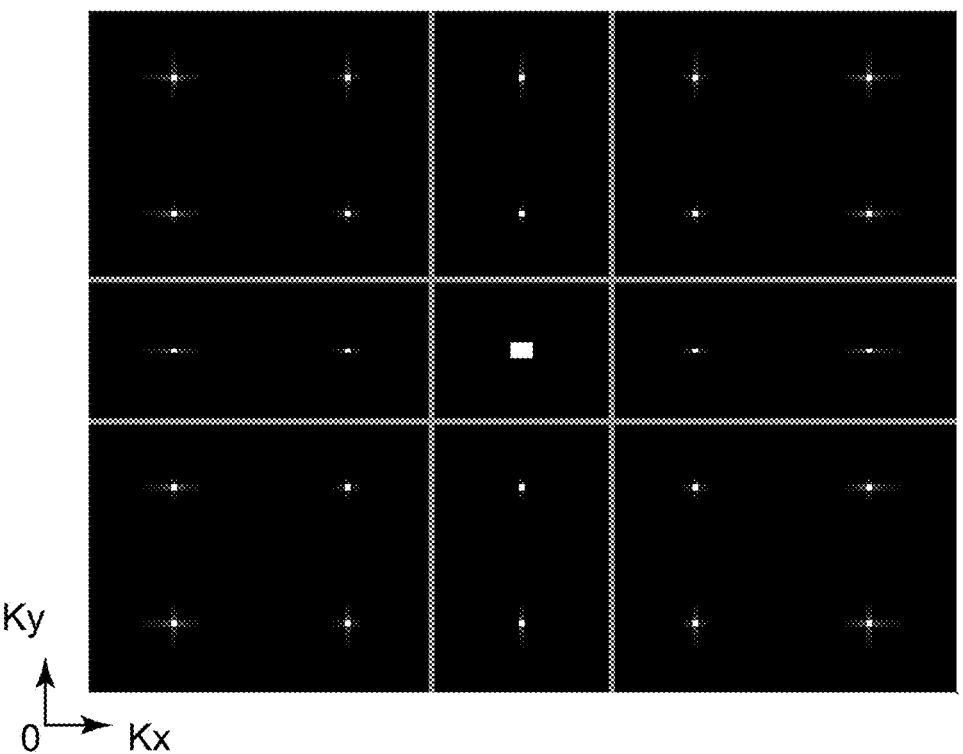
FIG. 14 illustrates the spectral response in a common receiver gather for regularly (on a grid) selected points.

In order to further illustrate the impact of the design methods, FIGS. 14-17 illustrate a spatial spectral response for a common receiver gather (i.e., a 2D Fourier transform in a 1 m×1 m sub-grid). FIG. 14 corresponds to the regular grid in FIG. 1, FIG. 15 to the random shooting points in FIG. 11, FIG. 16 to the randomly selected shooting points with one point in each pavement in FIG. 12, and FIG. 17 corresponds to FIG. 13 representing the same 2D survey area in which the shooting points have been selected randomly, one shot in each pavement, by taking into consideration all the operational constraints.

Figure 15:
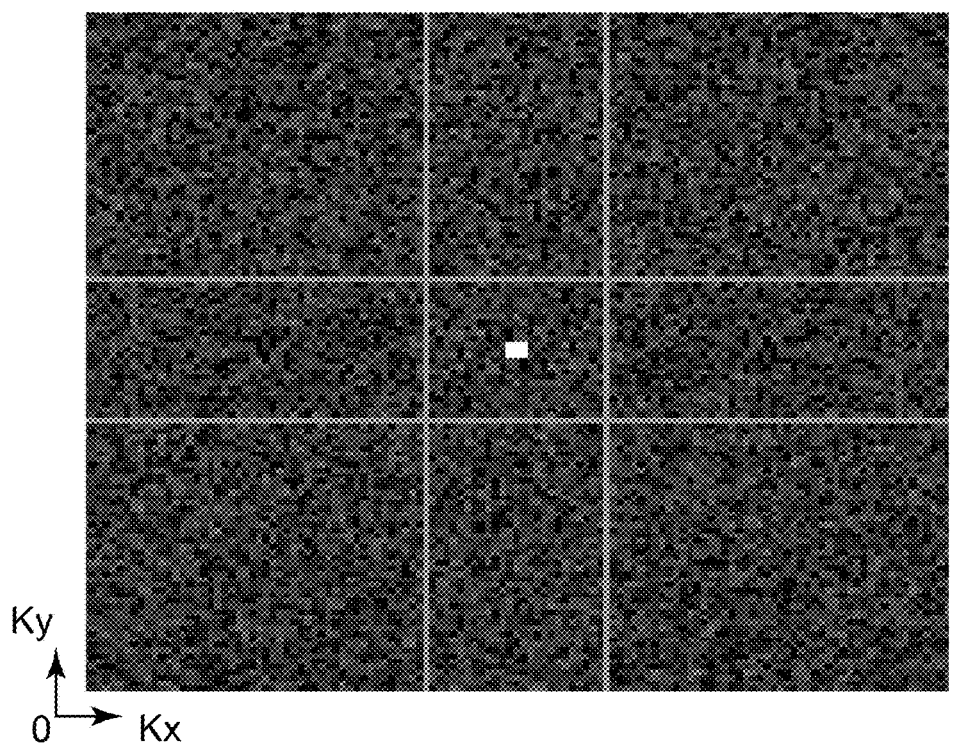
FIG. 15 illustrates the spectral response in a common receiver gather for the randomly selected shooting points in FIG. 11.

Aliasing focus is visible in FIG. 14. FIG. 15 no longer shows aliasing focus, but is flooded by white noise. Similarly, FIG. 16 no longer shows aliasing focus, with white noise present everywhere except around the signal zone (the area in between both the horizontal and vertical pairs of lines corresponding to the small wave number). Further, FIG. 17 shows a light aliasing focus (due to the direction limitations) and white noise being present everywhere except around the signal zone.

Figure 18:
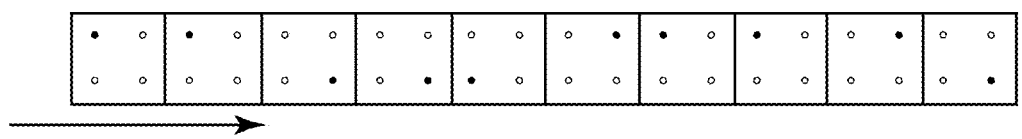
FIG. 18 is an illustration of shooting locations on sub-grids inside pavements along a survey line according to an embodiment.

FIGS. 18-24 are related to a second case study. The pavements and the operational constraints are the same as in the first case but, in this case, as illustrated in FIG. 18, the shooting points inside each pavement are among four predefined sub-grid corners.

Figure 19:
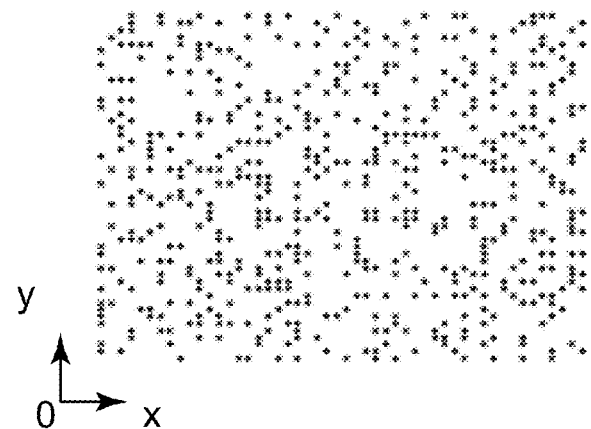
FIG. 19 illustrates the 2D survey area, where the shooting points are selected randomly from the sub-grid points without taking into consideration any operational constraint, according to an embodiment.
Figure 20:
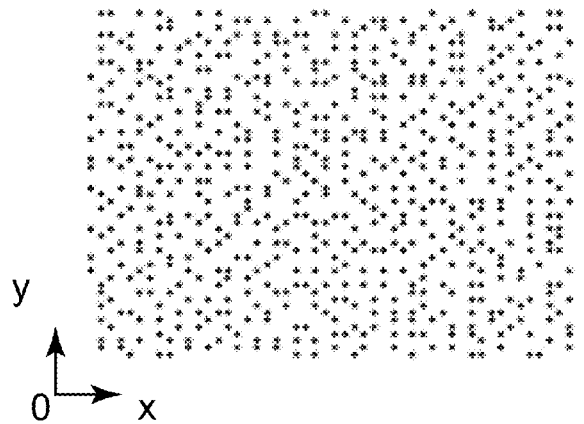
FIG. 20 illustrates the same 2D survey area in which the shooting points are selected randomly from the sub-grid points with one shooting point in each pavement, according to another embodiment.
Figure 21:
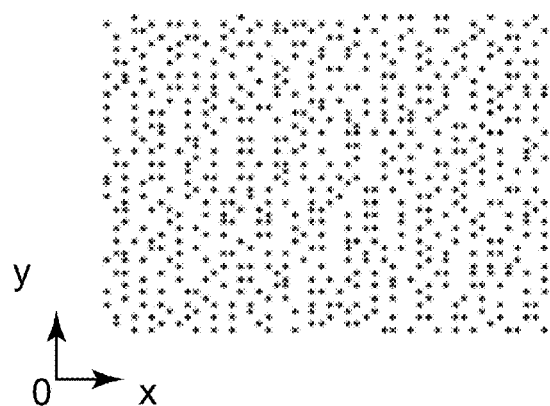
FIG. 21 illustrates yet the same 2D survey in which the shooting points have been selected randomly among the sub-grid points, with one shooting point per pavement and taking into consideration all the operational constraints, according to another embodiment.

FIG. 19 illustrates the 2D survey area, where the shooting points are selected randomly from the sub-grid points without taking into consideration any other operational constraints. FIG. 20 illustrates the same 2D survey area in which one of the sub-grid points is selected in each pavement, resulting in an increase of 6.6% in the mean length between successive shooting points. Finally, FIG. 21 illustrates yet the same 2D survey in which the shooting points have been selected randomly among the sub-grid points, one point in each pavement, and all the operational constraints have been considered, resulting in an increase of 2.6% in the mean length between successive shooting points (compared to the regular pattern with shooting in the middle of the pavements).

Figure 22:
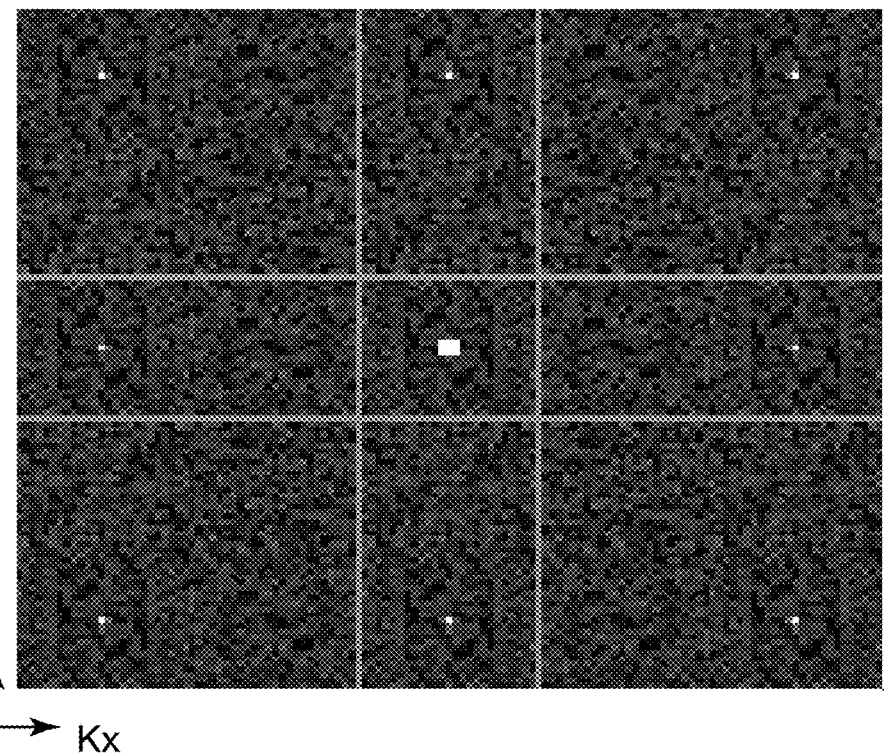
FIG. 22 illustrates the spectral response in a common receiver gather for the randomly selected shooting points in FIG. 19.

Similar to FIGS. 15-17, FIGS. 22-24 illustrate a spatial spectral response for a common receiver gather (i.e., a 2D Fourier transform in a 1 m×1 m sub-grid). FIG. 22 corresponds to the randomly selected sub-grid shooting points in FIG. 19, FIG. 23 to the sub-grid shooting points in FIG. 20, and FIG. 24 corresponds to corresponds to the sub-grid shooting points in FIG. 21 (i.e., representing the same 2D survey area in which the sub-grid shooting points have been selected randomly, one point in each pavement, by taking into consideration all the operational constraints).

Figure 16:
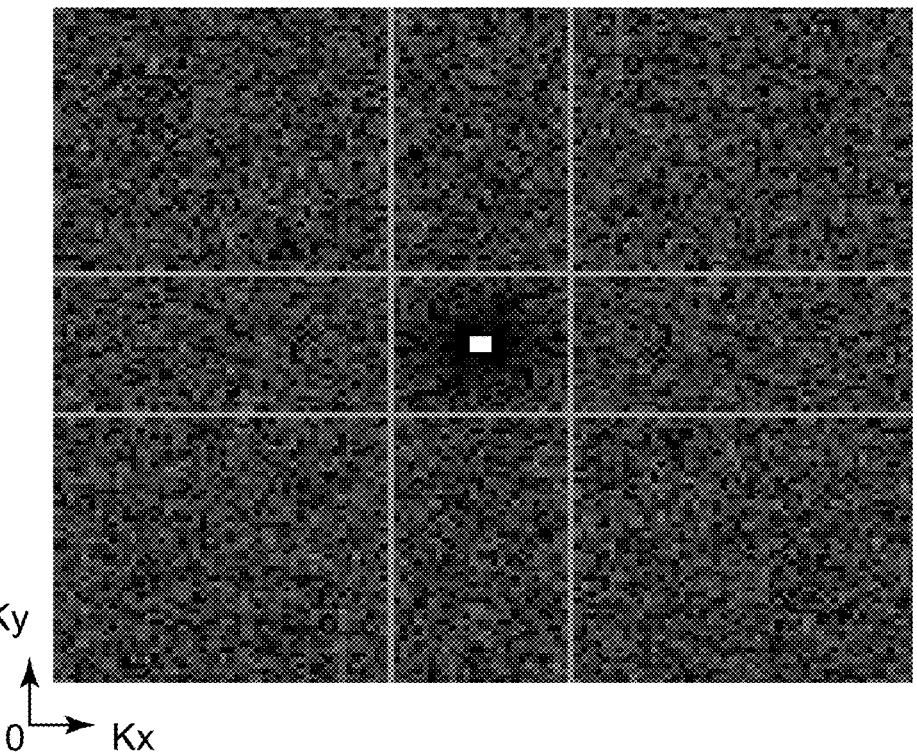
FIG. 16 illustrates the spectral response in a common receiver gather for the randomly selected shooting points in FIG. 12.
Figure 17:
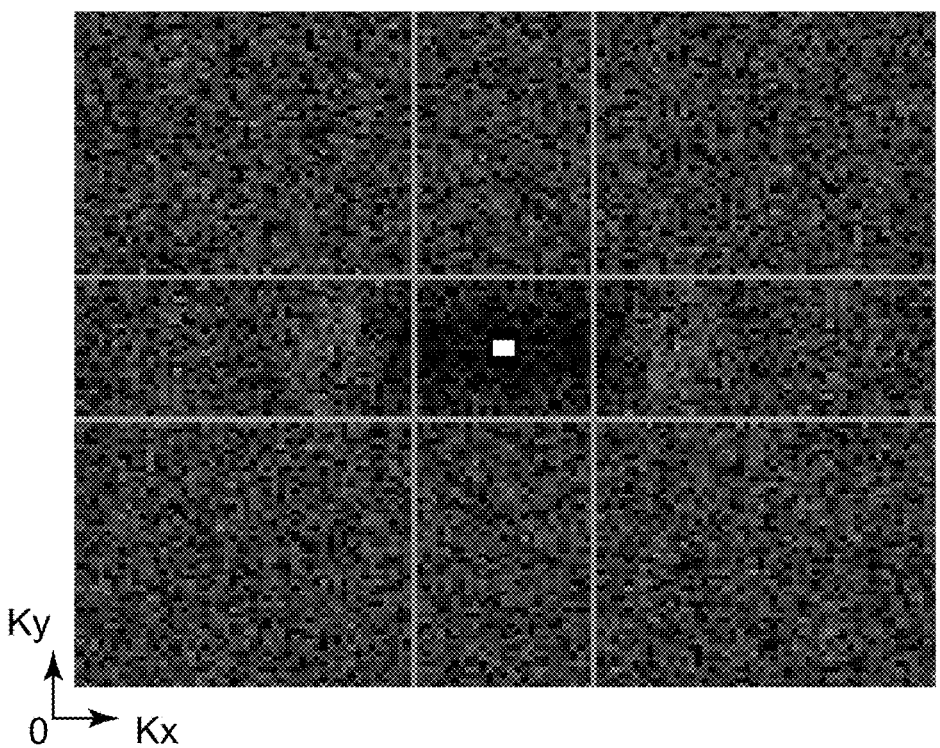
FIG. 17 illustrates the spectral response in a common receiver gather for the shooting points in FIG. 13.
Figure 23:
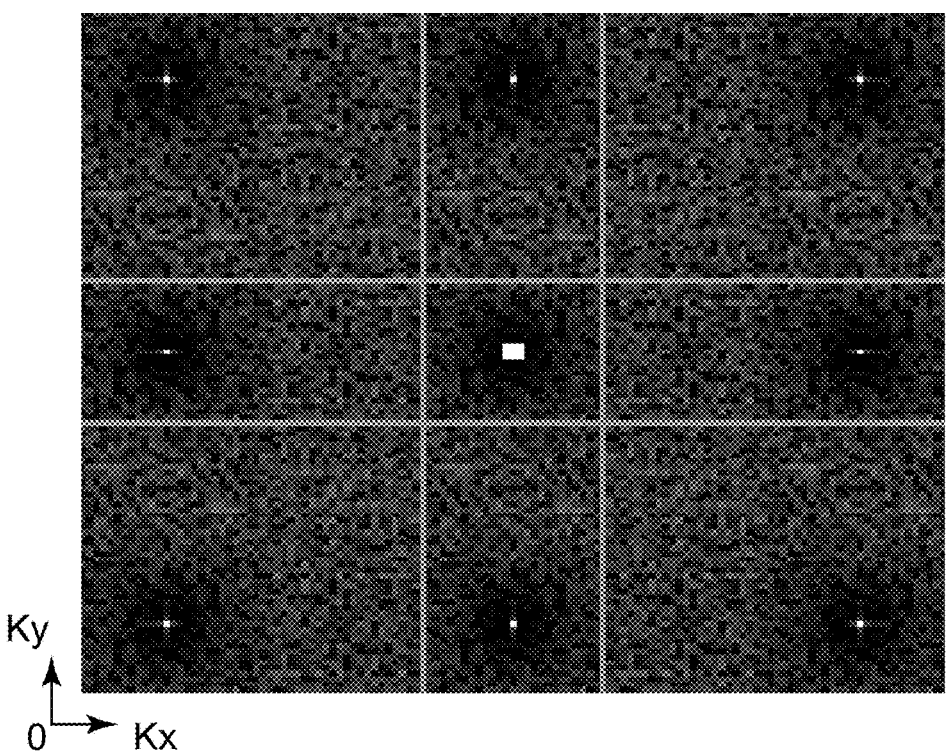
FIG. 23 illustrates the spectral response in a common receiver gather for the randomly selected shooting points with one shooting point in each pavement as in FIG. 20.
Figure 24:
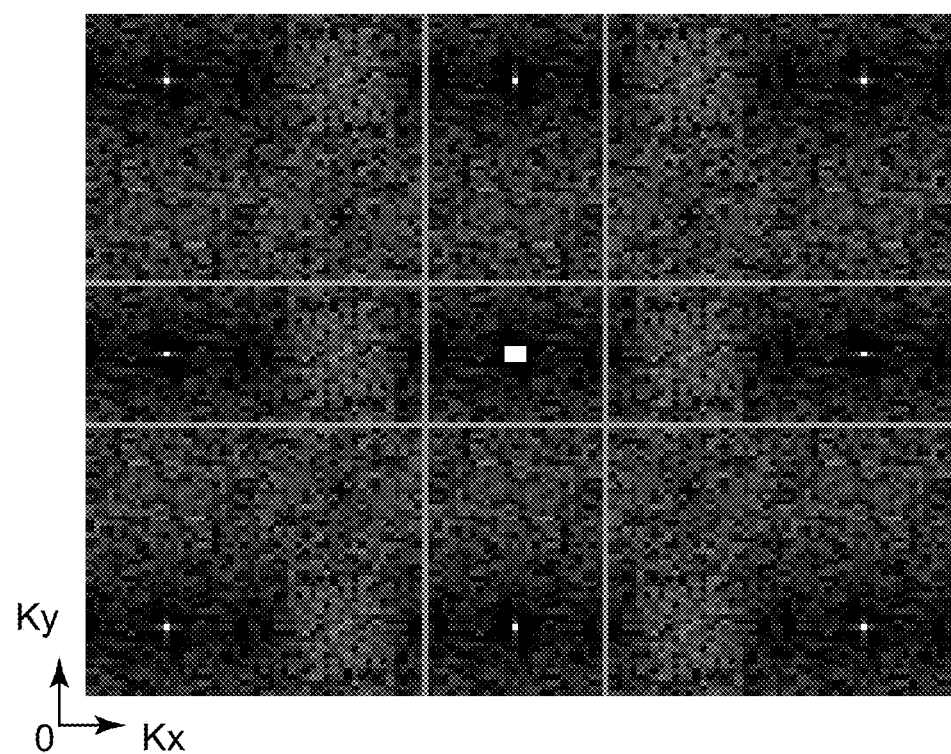
FIG. 24 illustrates the spectral response in a common receiver gather for the randomly selected shooting points, with one shooting point per pavement and taking into consideration all the operational constraints as in FIG. 21.

Unlike FIGS. 16 and 17, in FIGS. 23 and 24 some noise focalization becomes visible, but around the signal zone (the area in between both the horizontal and vertical pairs of lines corresponding to the small wave number) the noise is attenuated.

The current embodiments provide advantages in terms of data quality for a small added cost. Data quality benefits from signal processing using compressed sensing. Comparing to a classic regularly gridded acquisition, the data acquisition designed with these embodiments does not add significant cost (e.g., a 2-3% longer survey time due to longer path).

Figure 25:
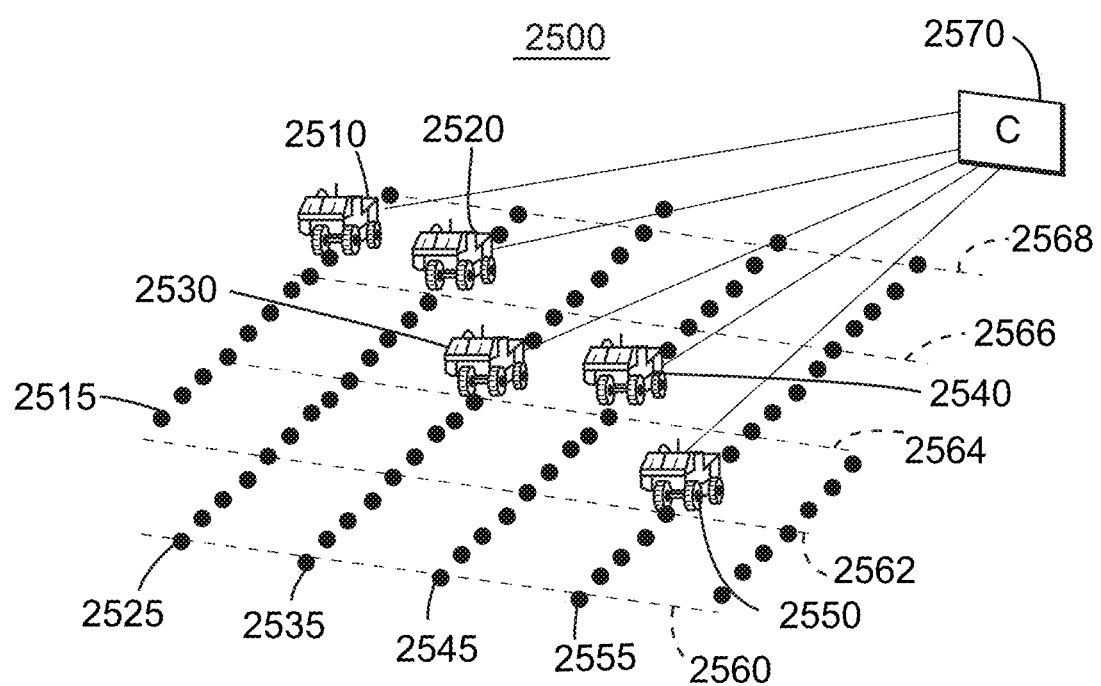
FIG. 25 is a schematic diagram of a seismic data acquisition system according to an embodiment.

FIG. 25 is a schematic diagram of a land seismic data acquisition system 2500 according to an embodiment. System 2500 includes seismic sources carried by trucks 2510-2550 along survey lines 2515-2555 respectively. Although in principle a single seismic source may be used, using multiple trucks (when available) shortens the survey time. System 2500 also includes receivers placed along receiver lines 2560-2568. The receivers are configured and placed to detect reflections of the seismic excitations generated by the seismic source(s) and emerging from the explored underground formation.

System 2500 also includes a controller 2570 configured to guide the seismic source(s) to the activation points along the survey lines. Controller 2570 is an activation points planner (may be on site or remote, operating in real-time and/or performing a pre-survey planning) which determines the activation points by performing the above-described methods according to various embodiments.

Figure 26:
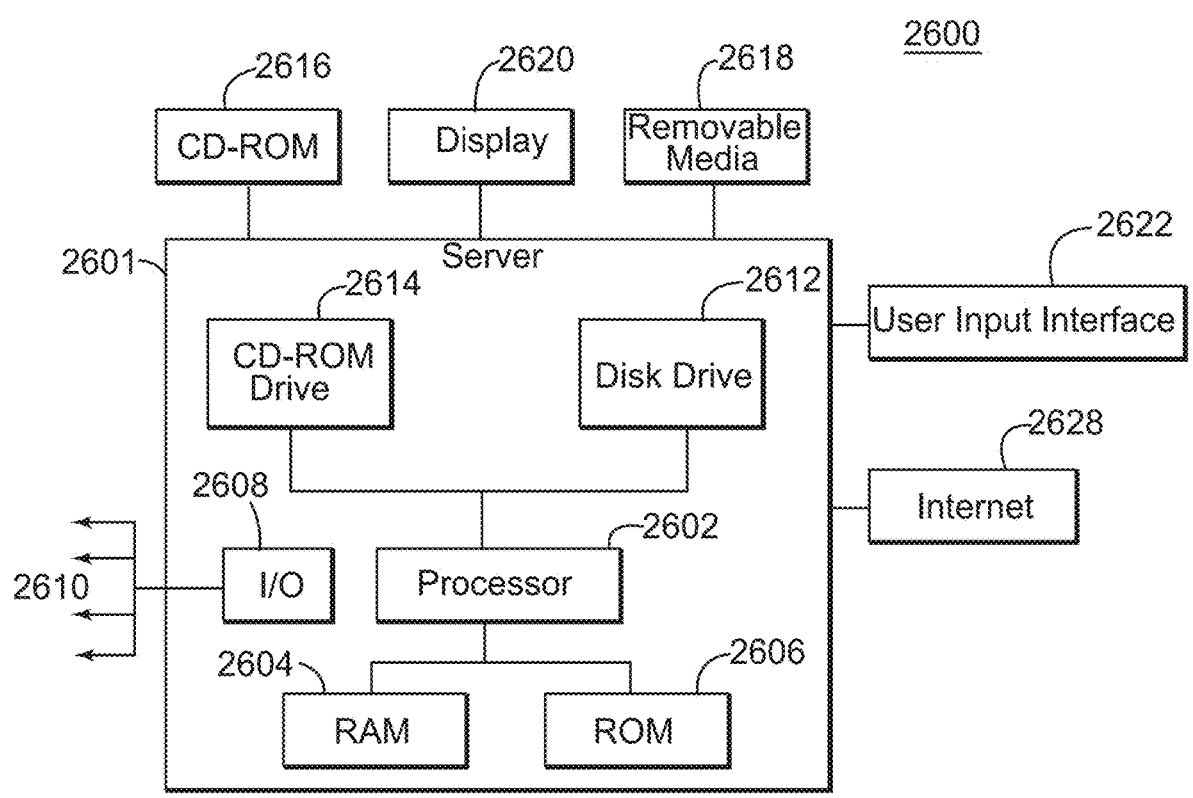
FIG. 26 is a block diagram of a seismic survey design apparatus according to another embodiment.

FIG. 26 is block diagram of a processing device 2600 suitable for performing the activities described in the exemplary embodiments (e.g., controller 2570). Processing device 2600 includes a server 2601 with a central processor unit (CPU) 2602 coupled to a random access memory (RAM) 2604 and/or to a read-only memory (ROM) 2606. The ROM 2606 may also be other types of storage media to store programs, such as programmable ROM (PROM), erasable PROM (EPROM), etc. Processor 2602 may communicate with other internal and external components through input/output (I/O) circuitry 2608 and bussing 2610 to provide control signals and the like. For example, processor 2602 may communicate with the various elements of each source element. Processor 2602 carries out a variety of functions as are known in the art, as dictated by software and/or firmware instructions.

Server 2601 may also include one or more data storage devices, including disk drives 2612, CD-ROM drives 2614, and other hardware capable of reading and/or storing information, such as a DVD, etc. In one embodiment, software for carrying out the above-discussed steps may be stored and distributed on a CD-ROM 2616, removable media 2618 or other form of media capable of storing information. The storage media may be inserted into, and read by, devices such as the CD-ROM drive 2614, disk drive 2612, etc. Server 2601 may be coupled to a display 2620, which may be any type of known display or presentation screen, such as LCD, plasma displays, cathode ray tubes (CRT), etc. A user input interface 2622 is provided, including one or more user interface mechanisms such as a mouse, keyboard, microphone, touch pad, touch screen, voice-recognition system, etc.

Server 2601 may be coupled to other computing devices, such as the equipment of a vessel, via a network. The server may be part of a larger network configuration as in a global area network (GAN) such as the Internet 2628, which allows ultimate connection to various landline and/or mobile client/watcher devices.

As also will be appreciated by one skilled in the art, the embodiments may be embodied in a wireless communication device, a telecommunication network, as a method or in a computer program product. Accordingly, the embodiments may take the form of an entirely hardware embodiment or an embodiment combining hardware and software aspects. Further, the embodiments may take the form of a computer program product stored on a computer-readable storage medium having computer-readable instructions embodied in the medium. Any suitable computer-readable medium may be utilized, including hard disks, CD-ROMs, digital versatile discs (DVD), optical storage devices or magnetic storage devices such a floppy disk or magnetic tape. Other non-limiting examples of computer-readable media include flash-type memories or other known types of memories.

This written description uses examples of the subject matter disclosed to enable any person skilled in the art to practice the same, including making and using any devices or systems and performing any incorporated methods. For greater clarity, the figures used to help describe the invention are simplified to illustrate key features. For example, figures are not to scale and certain elements may be disproportionate in size and/or location. The patentable scope of the subject matter is defined by the claims, and may include other examples that occur to those skilled in the art. Such other examples are intended to be within the scope of the claims. Those skilled in the art would appreciate that features from any embodiments may be combined to generate a new embodiment.

The disclosed embodiments provide methods for optimizing seismic data acquisition using compressed sensing. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for performing seismic data acquisition in a survey area, the method comprising:
defining non-overlapping successive pavements along a survey path so as to cover the survey area;
sequentially determining activation points inside the non-overlapping successive pavements, respectively, wherein a current activation point in a pavement is selected if there is a set of activation points that starts with the current activation point and continues with a random point in each of a predetermined number of the non-overlapping successive pavements along the survey path, the set of activation points satisfying predetermined operational constraints, the predetermined operational constraints being due to limitations related to a motion of a seismic source from one activation point to a next activation point, and to a physical reality within each pavement; and
acquiring seismic data by generating seismic excitations at the determined activation points.

2. The method of claim 1, wherein the limitations related to the motion include a minimum curvature of a source's path between adjacent activation points.

3. The method of claim 1, wherein the limitations related to the motion include a maximum acute angle between successive segments defined by activation points in adjacent pavements.

4. The method of claim 1, further comprising:
associating topographic information with the pavements, the topographic information being used to evaluate at least one of the predetermined operational constraints.

5. The method of claim 4, wherein the predetermined operational constraints include a maximum tilt of a seismic source moving from one activation point to a next activation point, a current tilt being estimated based on the topographic information.

6. The method of claim 4, wherein the predetermined operational constraints include avoiding one or more forbidden zones within at least one of the pavements, the forbidden zones being identified using the topographic information.

7. The method of claim 1, wherein the pavements have rectangular shapes.

8. The method of claim 1, wherein an activation point in a pavement is selected from predetermined locations inside the pavement.

9. The method of claim 8, wherein the predetermined locations form a sub-grid.

10. A seismic data acquisition system, comprising:
a seismic source configured to generate seismic excitations that propagate inside an explored underground formation;
receivers configured and placed to detect reflections of the seismic excitations emerging from the explored underground formation; and
a controller configured to guide the seismic source to activation points that the controller determines by:
defining non-overlapping successive pavements along a survey path so as to cover a survey area; and
sequentially determining the activation points inside the non-overlapping successive pavements along the survey path, wherein a current activation point in a pavement is selected if there is a set of activation points that starts with the current activation point and continues with a random point in each of a predetermined number of the non-overlapping successive pavements along the survey path, the set of activation points satisfying predetermined operational constraints, the predetermined operational constraints being due to limitations related to a motion of a seismic source from one activation point to a next activation point, and to a physical reality within each pavement.

11. The seismic data acquisition system of claim 10, wherein the limitations include a minimum curvature of a source's path between adjacent activation points.

12. The seismic data acquisition system of claim 10, wherein the limitations include a maximum acute angle between successive segments defined by activation points in successive pavements.

13. The seismic data acquisition system of claim 10, wherein the controller associates topographic information with the pavements, the topographic information being used to evaluate at least one of the predetermined operational constraints.

14. The seismic data acquisition system of claim 13, wherein the predetermined operational constraints include a current tilt being less than a maximum tilt of the seismic source moving from one activation point to a next activation point, the current tilt being estimated based on the topographic information.

15. The seismic data acquisition system of claim 13, wherein the predetermined operational constraints include avoiding one or more forbidden zones within at least one of the pavements, the forbidden zones being identified using the topographic information.

16. The seismic data acquisition system of claim 10, wherein an activation point in a pavement is selected from predetermined locations in the pavement.

17. The seismic data acquisition system of claim 16, wherein the predetermined locations form a sub-grid.

18. A seismic survey design apparatus, comprising:
an interface configured to receive information about a survey area and operational constraints and to output commands for placing a seismic source at activation points; and a processor connected to the interface and configured:

to define non-overlapping successive pavements along a survey path so as to cover the survey area; and to successively determine the activation points of a seismic source inside pavements, respectively, wherein a current activation point in a pavement is determined as being one of the activation points if there is a set of activation points that starts with the current activation point followed and continues with a random point in each of a predetermined number of the non-overlapping successive pavements along the survey path, the set of activation points satisfying predetermined operational constraints, the predetermined operational constraints being due to limitations related to a motion of a seismic source from one activation point to a next activation point, and to a physical reality within each pavement.

19. The seismic data acquisition system of claim 10, wherein the seismic source is further configured to transmit information obtained by a direct observation during a survey, to the controller; and the controller is further configured to update the activation points by taking into consideration additional operational constraints based on the information obtained by the direct observation during the survey.

20. The seismic survey design apparatus of claim 18, wherein the interface is further configured to receive information obtained by a direct observation during a survey; and the processor is further configured to update the activation points by taking into consideration additional operational constraints based on the information obtained by the direct observation during the survey.

\* \* \* \* \*